United States Patent [19]

Valencia et al.

[11] Patent Number: 5,380,991
[45] Date of Patent: Jan. 10, 1995

[54] PAPERLESS COUPON REDEMPTION SYSTEM AND METHOD THEREOF

[76] Inventors: Luis Valencia, 883 Main St., Norwell, Mass. 02061; John Howe, 19 Roubound Rd., Norwell, Mass. 02061

[21] Appl. No.: 152,129

[22] Filed: Nov. 16, 1993

[51] Int. Cl.[6] .......................................... G06K 15/00
[52] U.S. Cl. .................................... 235/383; 235/375; 235/492
[58] Field of Search ................ 235/375, 383, 492; 364/401

[56] References Cited

U.S. PATENT DOCUMENTS

| | | |
|---|---|---|
| 4,554,446 | 11/1985 | Murphy et al. |
| 4,674,041 | 6/1987 | Lemon et al. |
| 4,723,212 | 2/1988 | Mindrum et al. |
| 4,882,675 | 11/1989 | Nichtberger et al. |
| 4,910,672 | 3/1990 | Off et al. |
| 4,949,256 | 8/1990 | Humble. |
| 5,047,614 | 9/1991 | Bianco. |
| 5,128,520 | 7/1992 | Rando et al. |
| 5,173,851 | 12/1992 | Off et al. |
| 5,185,695 | 2/1993 | Pruchnicki. |
| 5,192,854 | 3/1993 | Counts. |
| 5,256,863 | 10/1993 | Ferguson ........................ 235/383 |

*Primary Examiner*—Harold Pitts
*Attorney, Agent, or Firm*—Hoffman, Wasson & Gitler

[57] ABSTRACT

A system and method of allowing a shopper to obtain the benefit of reduced prices for certain items without the necessity of redeeming paper coupons is described, The system employs an integrated circuit (IC) smart card containing an erasable memory therein. This memory would contain information relating to a discount coupon amount, as well as information relating to particular products which have been purchased. This card would be inserted into a reader/writer terminal provided at a retailer's checkout counter. Items which are purchased are scanned and compared with items to be discounted as well as the information provided by the customer IC smart card. After the cashier has totaled the customer's purchases, the information contained in the IC smart card would be altered accordingly.

36 Claims, 4 Drawing Sheets

PAPERLESS COUPON REDEMPTION SYSTEM AND METHOD THEREOF

BACKGROUND OF THE INVENTION

1. Field of the Invention

This invention relates generally to the field of retail coupon redemption utilizing a so-called "smart" card without the necessity of employing paper coupons.

2. Prior Art

Current food industry practice in the promotion of brand name products generally falls into two categories: new product introduction for creating a demand for a particular product; and existing product promotion for the purpose of retaining or expanding current market share of a particular product. The standard method of promotion used to effectuate these purposes is to provide coupon offerings as price discount inducements to initially try or repurchase a particular product. Currently, the results of these efforts are not cost-effective or easily managed.

Historically, a manufacturer or a retailer would produce a relatively large number of coupons, i.e. in the range of 20 to 50 million, and distribute these coupons to the public. Typically, these coupons would be printed in local or national publications, distributed to customers, mailed directly to potential customers or printed on the packaging of a product which is sold, all to induce the purchasing of this product by the consumer. Furthermore, once the coupon is redeemed by the customer at a retail center, such as a supermarket, the coupons are sent to a clearing house for redemption. If indeed 50 million coupons are printed, the approximate cost of producing and redeeming these coupons would be approximately $250,000.

While many customers are inclined to utilize these coupons, due to the increasingly high costs of food and household items, the process of clipping and saving these coupons tends to be time-consuming and cumbersome. Furthermore, once these coupons are retained by the customer, the customer must remember to bring these coupons to the store for redemption. Often times, the customer will not bring his or her coupons when "running into the store" to make a quick purchase. Additionally, once the customer makes his or her purchases, the coupons associated with these purchases must be located among the coupons which the customer is not utilizing, the expiration dates of these coupons must be checked, and the coupons must then be given to the store clerk for scanning or otherwise entering the items into the store's computer. Once the store accumulates a number of coupons, they must then be sent to a redemption center, which in turn informs the various manufacturers of particular coupon usage.

It is not suggested that, due to the tedious nature of this process discount coupons be eliminated, particularly since, due to the high cost of various products, such as breakfast cereals, the manufacturers would expect that customers would utilize discount coupons to make these products more affordable. Rather, it is suggested that a different system should be developed in which discounts can be applied to various products in a more economical and efficacious process.

Recently, a number of systems have been developed which address this problem of coupon redemption. For Example, U.S. Pat. No. 5,185,695, issued to Pruchnicki, describes a method and apparatus for creating and processing discount coupons without the necessity of having the coupons printed, distributed and then redeemed at the checkout counter. A master list is compiled which is then transmitted to the local retailers who sell the products which are the subject of the coupons. Coupon indicia is printed and then displayed adjacent to the particular product. When a customer purchases each product subject to the discounted coupon, the amount of the discount would be automatically deducted from the purchases price. While this system does eliminate the use of coupons, it does not engender itself to the situation in which a manufacturer wishes to induce a customer to repurchase a product by offering increasing discounts based upon previous purchases of that product.

Another approach to the problem of coupon redemption is illustrated in U.S. Pat. No. 4,882,675, issued to Nichtberger et al. This patent describes a paperless system for distributing, redeeming and clearing merchandise coupons. Each customer receives a card insertable into a local station which electronically displays each coupon which can be redeemed. The customer then selects the coupons he wishes to redeem, which are then entered onto his card. When the customer makes his purchases and presents the card to an automated local coupon distribution and redemption (CDR) unit, the CDR will compare the items purchased with the selected coupons on the customer's card, and then make the appropriate reductions in price. Unfortunately, the card which is utilized employs a magnetic strip memory device, thereby limiting the information which is programmed thereon. Furthermore, the card which is utilized in this system is redeemed at the checkout counter and not retained by the customer.

U.S. Pat. No. 5,192,854, issued to Counts, illustrates a system for electronically recording and redeeming coupons in which bonus points are offered by a manufacturer for buying specified products. Although this patent does address the situation in which bonuses are given to a customer for purchasing a particular product, the system employs paper coupons, meaning that these coupon must be redeemed.

U.S. Pat. No. 5,047,614, issued to Bianco, shows a system or a method and apparatus for computer-aided shopping in which a "smart" card is employed. However, this patent does not address itself to the problems described hereinabove relating to the paperless redemption of coupons.

SUMMARY OF THE INVENTION

The present invention overcomes the deficiencies of the prior art by employing a paperless coupon redemption system, thereby avoiding the problems of the prior art in which paper coupons must be distributed by a manufacturer, retained by a customer, brought to a consumer outlet, organized at a checkout station, inspected to determine whether the coupons are expired and then redeemed at a central clearing house.

The system of the present invention avoids these problems by generating a list of products to which a manufacturer's or retailer's discount is to be applied as well as the amount of the discount. This list is then delivered either electronically or manually to a computerized clearing house for the preparation of various aisle shelf tags or other devices which the customer would associate with the discounted product. If a tag is utilized, it would be affixed to the store shelf associated with the discounted item, generally overlaying an indicator relaying certain information about a particular product, such as the retail price of the product, as well as its associated bar code. This tag could be color coded to indicate various denominations of discounts. Furthermore, the tag could include several discount prices associated with a particular product, indicating that the customer would receive additional discounts if the particular product is repurchased. The top half of the tag is clear plastic and would be applied over the existing indicator. The bottom half of the tag would extend from the bottom of the indicator and would include the appropriate discount information.

An integrated circuit card having a processor and an erasable, programmable memory, generally known as a "smart" card, would be issued to each customer, which would include the customer's identification number, and other personal information, as well as an amount of potential discounts, such as $250 in its memory (hereinafter referred to as a smart card). Once all of the customer's items are scanned, the customer would present his smart card to the cashier, which would then be scanned by an appropriate terminal scanner. Information relating to the scanned items would be sent to a main computer which would compare the items purchased to those items on which a discount is to be applied, and then deduct this amount from the purchaser's receipt total, as well as deduct the same amount from the total amount of discounts included on the smart card. It should be noted that the comparison between the scanned items and the items to which a discount is to be applied can, alternatively, be performed in the card terminal itself, and not necessarily in the main computer. If one or more of the items are subject to additional or progressive discounts, the system would scan the customer's smart card to determine whether this particular item has previously been purchased by the customer. If this is the case, an increased discount would be deducted from the customer receipt total, as well as deducted from the discount amount reflected in the customer's smart card.

Reconciliation units associated with each cashier's register, as well as a store-wide reconciliation unit, would be in communication with a national master computer reconciliation unit on a periodic basis to process these "paperless electronic" discount coupons. This data would allow each individual manufacturer who has issued these "paperless electronic" discount coupons to properly reimburse this national clearing house, as well as allow the national clearing house to reimburse or to be reimbursed by each individual retailer.

BRIEF DESCRIPTION OF THE DRAWINGS

These and other objects of the present invention will be described in conjunction with the accompanying drawings, in which.

DETAILED DESCRIPTION OF THE PREFERRED EMBODIMENT

Figure 1:
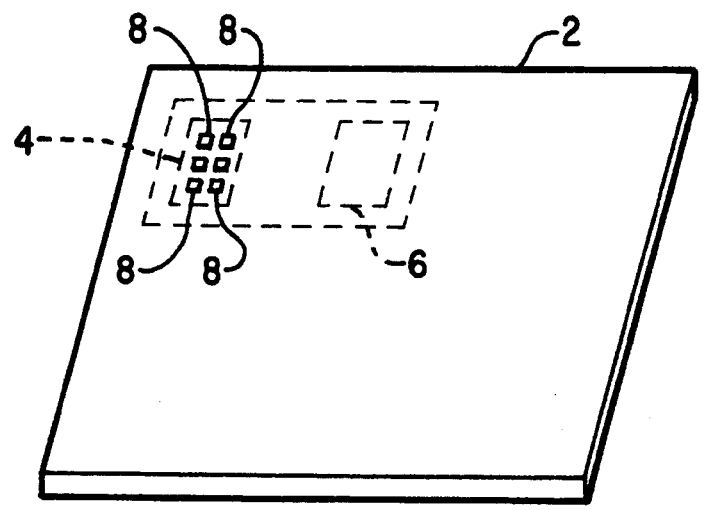
FIG. 1 is a perspective view illustrating the outline of the integrated circuit smart card.

One of the major components of the present invention is the customer card which is carried by each of the participating customers. This customer card is designed to be an integrated circuit (IC) card known commonly as a smart card. A typical smart card 2 is shown in FIG. 1. This card has a one-chip microcomputer 4 and a memory, such as an EEPROM or EPROM, 6. The smart card 2 has a plurality of terminals 8 through which it exchanges the necessary data with an external terminal device, executes data processing and writes data into the memory 6. The terminal device can be further coupled to a host computer or computer system.

Figure 2:
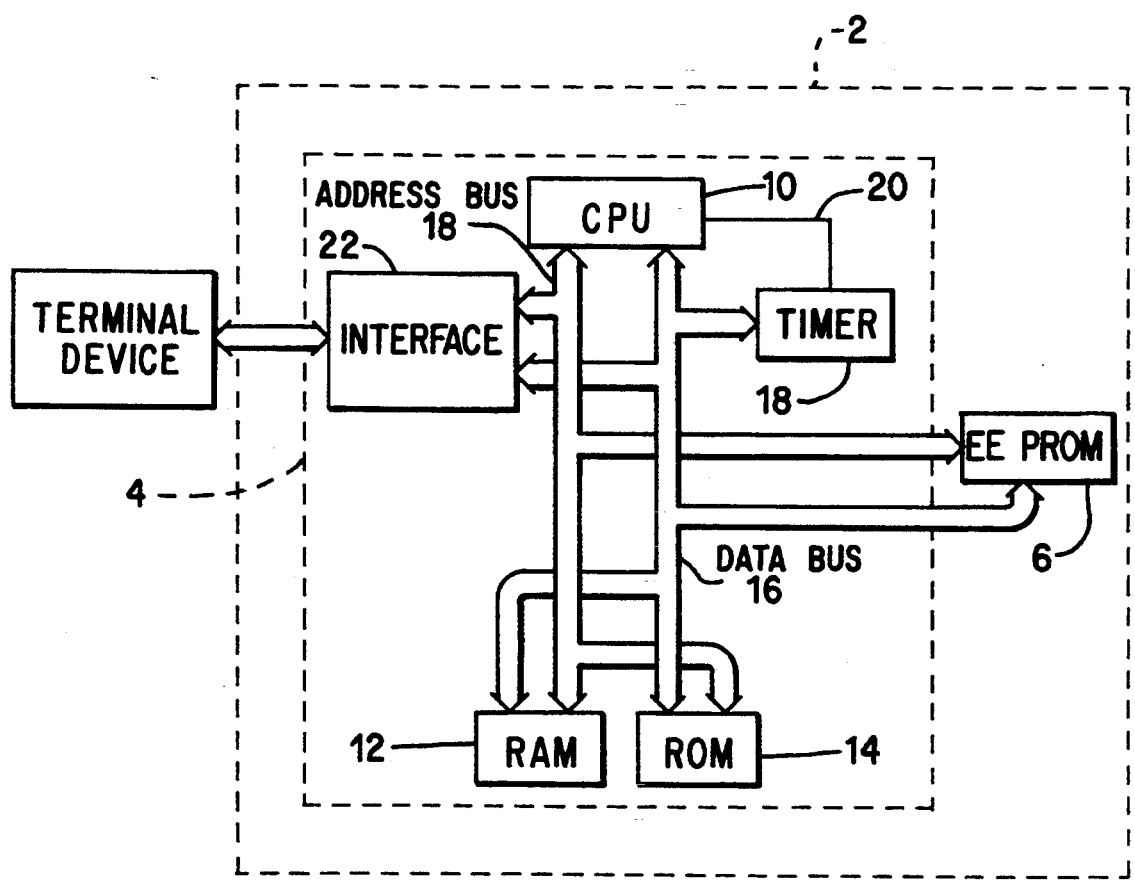
FIG. 2 is a block diagram of the integrated circuit smart card.

FIG. 2 shows a block diagram illustrating the circuit arrangement of the smart card 2. The microcomputer 4 and memory 6 are coupled together through an address bus 18 and a data bus 16. Within the microcomputer 4, a CPU 10 is coupled to a timer 18 through the data bus 16 and an internal interrupt signal bus 20. Internal memories, such as the read-only memory (ROM) 14 and the random access memory (RAM) 12 of the microcomputer 4, are coupled through the address bus 18 and the data bus 16 to an interface 22 for communication with the terminal device.

Although FIGS. 1 and 2 describe the construction of a typical IC or smart card, it is noted that the particular construction of this card is unimportant to the teachings of the present invention. What is important is the utilization of a card having an erasable, programmable memory as well as data processing capabilities, so that the information provided in the memory of the card can be compared to information contained in a computer system (and also in every card terminal) for updating the information contained in the card.

The smart card can be utilized in conjunction with a discount coupon program that uses a guiding system called "shop the dots" to induce the customer to take advantage of a one-time discount or ongoing discounts through a program of progressive couponing. The "shop the dots" concept is a system developed exclusively to allow the shopper that has purchased or otherwise obtained the smart card to take full advantage of all manufacturers' coupons and in-store promotions. This is a system that would allow the shopper to readily identify available savings through symbols and color association plainly displayed on or associated with the aisle shelf tags, while not misleading customers that are not participating into believing that these discounts apply to them as well.

Based upon various factors, a manufacturer or retailer would develop a list of items to which "paperless electronic" discount coupons would be made available. This list would include the products subject to the "paperless electronic" discount coupons as well as the amount that would be deducted upon the purchasing of this item by the customer.

Figure 3:
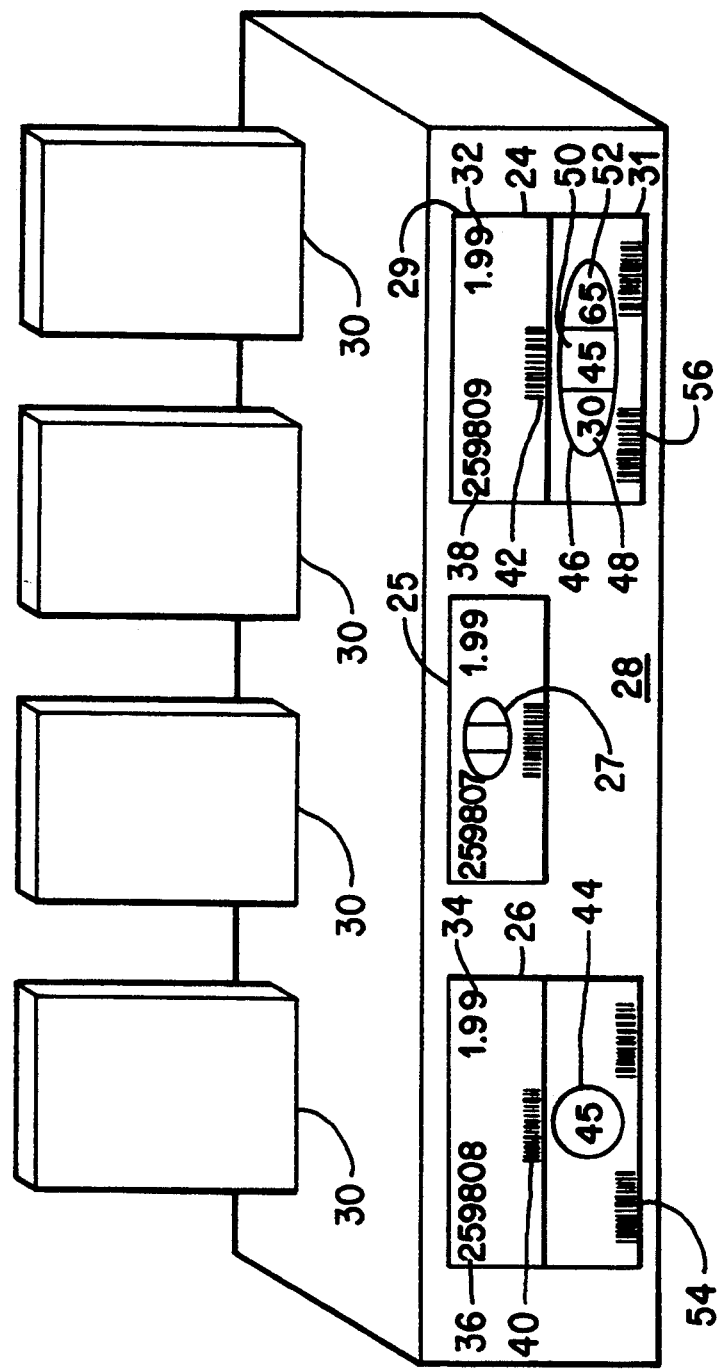
FIG. 3 is a perspective Figure showing display coupons associated with particular products.

Alternatively, as shown in FIG. 3, aisle shelf tags 24, 26 are directly affixed over the existing store indicator tag 25, which itself is provided on in-store shelves 28 in proximity with the particular retail items 30 associated with these tags. Each existing store indicator tag 25 would include the retail price of the item 32, 34, alphanumeric codes 36, 38 relating to each product, as well as their respective bar codes 40 and 42. Each of the tags 24, 26, according to the present invention, is provided with a top clear plastic portion 29 which overlays the existing shelf indicator tag 25, allowing all of the information contained on the indicator tag 25 to be displayed. Each tag 24, 26 is also provided with a bottom portion 31 extending from the bottom of the existing shelf indicator tags 25. This bottom portion 31 would include a colored symbol 44, 46 of a particular shape which would include the appropriate discount amount. Bar codes 54, 56 can also be included on the bottom portion 31, which are related to the national system coupon number and the expiration date of the coupon. Although the exact size and symbols which can be utilized are not crucial to the present invention, as shown in FIG. 3, the "shop the dots" method of discounting would include a round configuration measuring approximately one inch in diameter. Additionally, each of these circles 44 of tag 26 would be of different colors, based upon the amount discounted. For example, a maximum of three colors, varying in intensity and readily distinguishable from one another, can be used to indicate and associate savings values and specific savings ranges.

The utilization of the particular colors and symbols of tag 26 would readily point out to a customer possessing knowledge of the "shop the dots" concept that particular products would be discounted, without confusing a customer not familiar with the "shop the dots" concept. Indeed, the existence of these tags 26 on the shelves would cause the customer uninformed of the "shop the dots" concept to inquire as to the meaning of such tags.

Tag 24 illustrates a discount coupon label associated with the progressive couponing concept. This concept is specifically designed to facilitate the introduction of new products into the marketplace. Specifically, manufacturers would want shoppers to initially try a product. Currently, paper coupons of high value are issued to tempt the customer into buying a newly introduced item. However, after this item is initially purchased by the consumer, the manufacturer would still want to convince the customer to again purchase this item in order to induce a new buying pattern. The present invention approaches this problem of establishing consumer buying habits by providing a progressive coupon. As illustrated in FIG. 3, this coupon 24 includes an oval-shaped discount portion 46 consisting of two semi-elliptically-shaped sections 48, 52 surrounding a rectangular section 50. Each of these sections contains a discounted price if the particular item is purchased initially, or purchased for the second or third time. Generally, the discount would increase in value for each subsequent purchase. Furthermore, for ease of distinction, each of these sections 48, 50 and 52 is presented with a different color. Similar to the "shop the dots" embodiment, the exact color, shape and number of these discount coupon sections is relatively unimportant.

This progressive coupon process is an open-ended invitation to try the product for the second or third time during a particular timeframe. This embodiment would solve the problem of the redemption of high-value coupons outside of a planned product introduction time, which would not deliver the sequential purchasing pattern desired by the manufacturer.

When the discount period has expired, tags 24, 26 are removed, leaving the existing shelf indicator tag 25 intact. However, with respect to the progressive coupon concept, it is important to inform a customer who has previously purchased a product before the expiration date that progressive coupon part values are still available to him, even when the bottom portions have been removed. In this instance, a miniature, full-color progressive coupon oval-shaped symbol 27 is shown applied to the indicator tag 25. This symbol 27 is a duplicate of the original full-sized symbol, with no face value indicated.

Since it is of paramount importance to determine whether a particular customer has previously purchased an item included in the progressive couponing technique, the customer's purchases must be tracked utilizing the smart card. Programmed into the erasable memory of the smart card would be a particular identification number associated with the customer, as well as an indication that a particular item subject to the progressive couponing system has been purchased. The smart card would then be updated by indicating an initial or subsequent purchase of an item subject to the progressive couponing system, as well as by deducting this discounted amount and any amounts discounted utilizing the "shop the dots" system from the customer's receipt total and the total amount presently listed in the card's memory.

Figure 4:
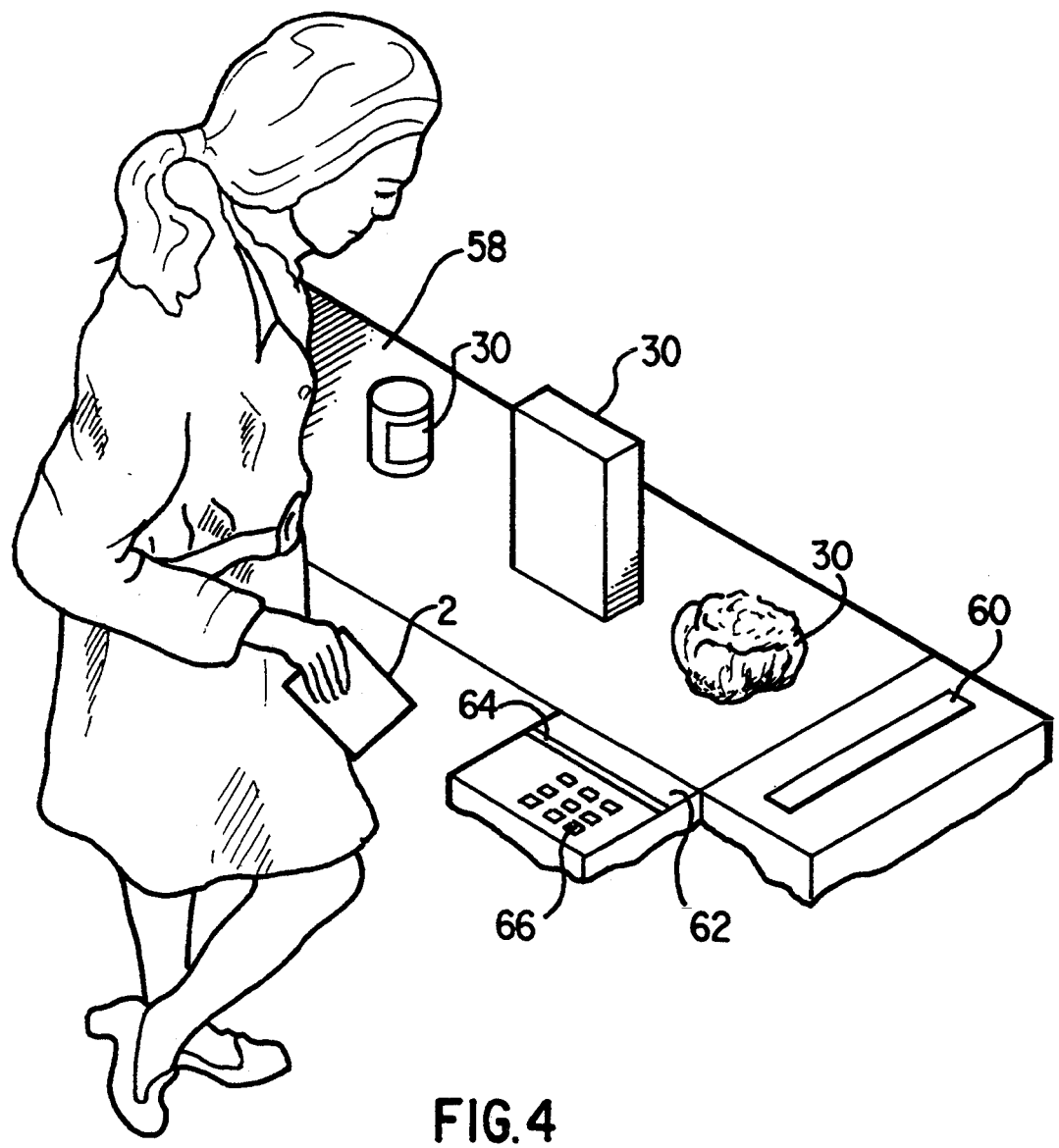
FIG. 4 is a perspective view of the cashier's checkout counter.

FIG. 4 illustrates the implementation of the present invention using the "shop the dots" as well as the progressive couponing technique. After all of the items 30 placed on a standard cashier conveyor belt 58 are scanned by an electronic scanner 60, a total is generated based upon the information provided in the store's central computer. The customer or the cashier would then place the customer's smart card 2 into a slot 64 provided in a reader/writer terminal 62 associated with each cashier. The information on this card, including the customer's identification number, the amount of discounting available to the customer, as well as the number and type of purchases that were made utilizing the progressive couponing system, and those items subject to the normal "shop the dots" system, is compared to the items which have been scanned, as well as a listing price of all of the items and any relevant discount provided in the store's central computer, as well as in each of the terminals. Thereafter, the total savings value is deducted from the discounting amount available on the card, and the information relating to the purchase of products subject to the progressive couponing technique is also altered utilizing the reader/writer 62. The reader/writer 62 is also provided with a keypad 66 for the purpose of inputting additional information into the smart card, as well as eliciting additional information therefrom. However, it can be appreciated that the present invention can operate with equal facility without the key pad 66.

Figure 5:
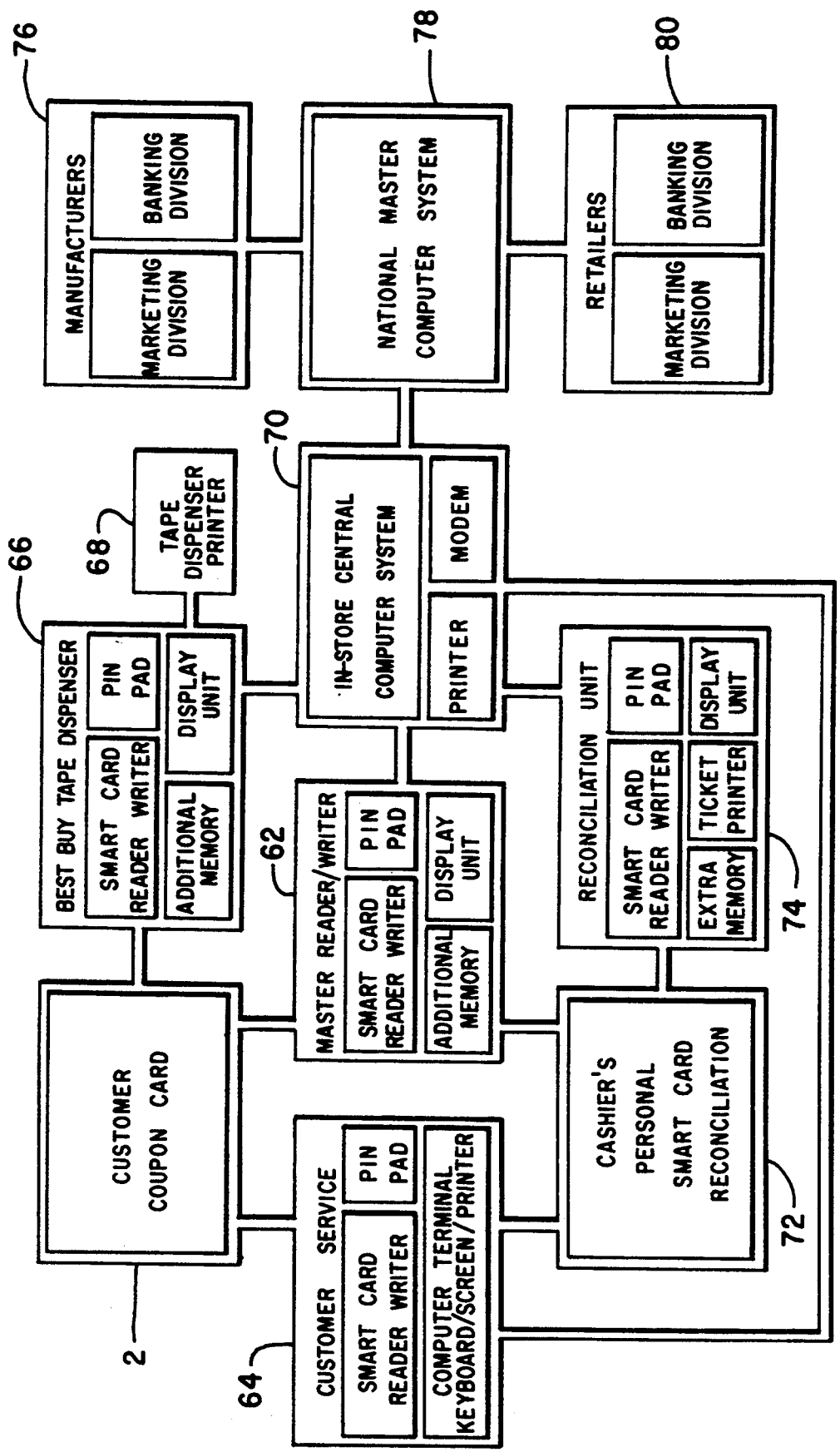
FIG. 5 is a block diagram of the entire system, according to the present invention.

The operation of the present system is illustrated in block diagram form in FIG. 5. The customer smart card 2, which is used to redeem the "paperless electronic" coupons, can be purchased from a customer service center 64 which can be a stand-alone unit or can be located in a retail establishment. Alternatively, this card may be directly purchased from a cashier using the master reader/writer unit 62 provided adjacent to the cashier's checkout counter. When purchased at the customer center 64, the purchaser would pay a particular dollar value, such as $25, to receive money from which the various discount coupons will be deducted. Typically, this amount could be $250. Alternatively, as an inducement to purchase various items, the amount initially credited to the card 2 could be complimentary to the customer. The customer service center 64 would then enter all of the necessary information into the card, including customer identification information. Alternatively, if purchased or given to the customer at the master reader/writer 62 associated with each cashier, an appropriate amount would be added to the card and a partial validation step would be performed by the master reader/writer 62, after which the customer would proceed to the customer service terminal 64 to complete the application process. Additional amounts can be added to each card 2 when the original amount has been depleted, utilizing either the customer service terminal 64 or the master reader/writer 62. These additional amounts would be purchased by the customer, or given free to the customer.

A best buy tape dispenser 66 in communication with the store's central computer system 70 and also self-contained in the memory of the reader/writer can be utilized by a customer provided with his smart card 2 to determine the "best buys" offered by the store. Upon insertion of the card 2 into the reader/writer of this terminal 66, the customer will be greeted and briefly instructed to wait and remove a tape being printed by the dispenser 68 associated with the terminal. The customer will be alerted by a beeping sound to withdraw his card from the terminal. The printing process of the tape would start immediately upon insertion and validation of the card. This is accomplished by the terminal 66 capturing the progressive coupon information stored on the card 2 and sending this information to the in-store computer system 3 to search and find the proper product name, description, any face value coupon which is applicable, product location (aisle number or department), expiration date (if any), and special conditions relating to the coupon offering. Having completed this operation, the in-store central computer system 70 would send the information back to the best buy tape dispenser 66 to instruct the printer unit to finish the printing of the customer best buy tape. This tape would include an output section showing personal information relating to the card 2, such as the identification number of the customer, the full name of the customer, the savings that the customer has obtained to date, as well as the remaining balance included on the card.

A second section of the tape would include a listing of the best buys currently offered by the store (in store promotions). A third section would be composed of as many progressive coupon items as the customer has had recorded on the card 2. A final section would be reserved for any special messages to be communicated to the card holder related to various special events.

Once the customer chooses his or her appropriate items, they are scanned by the scanner 60, which is in communication with the in-store central computer, to obtain the appropriate pricing information. Once obtained, this information is sent to the master reader/writer 62 which is provided at each cashier's checkout station. Once all of the items have been scanned and totaled, the card 2 is inserted into the master reader/writer 62. The specific act of inserting the card therein would allow the master reader/writer 62 to perform a series of tests with the card, one of which relates to the search of progressive coupon information residing in the card. Having found, or not found, this information in the card, this information is also sent to the in-store central computer system 70. Residing in this system 70 is all of the information relating to a specific coupon value issued by the manufacturer, arranged to match the number sequence for each product in order to search and differentiate between items. As it pertains to progressive coupon items, the computer system 70 will search and match the appropriate coupon value according to the flag position noted on the customer's card 2. The in-store central computer system 70 will then add the progressive coupon values to the value of all other coupon discounts applicable to the total customer purchase. The total savings value and updated flag tracking information is sent back to the master reader/writer 62 and is recorded on the customer's smart card 2. It should be noted that, although the system of the present invention employs a centralized in-store computer system 70, all of the functions of the system 70 can be performed at terminals 62, 64 and 66. This is important, since the system would still operate even if the central in-store computer system fails.

Communications between the various manufacturers 76 as well as the retailers 80 to a national computer system 78 in communication with each in-store central computer system 70 is needed to effectuate the operation of this system. Typically, the manufacturers would formulate a list of items which would be subject to discounts using the "shop the dots" system in conjunction with the progressive couponing system. This information would also include the amount of discounts applicable to each item as well as the inclusion of any expiration date. This information is either electronically or manually delivered to the national master computer system 78, which would then inform each participating in-store central computer system 70 of the various information necessary to implement the present invention. If the aisle shelf tags associated with the present invention, as illustrated in FIG. 3, are utilized, these tags can be supplied to the national master computer system 78 for delivery to each store. Alternatively, information relating to these various discounts can be electronically transmitted to the in-store central computer system 70 in a manner such that the stores themselves would generate these tags. Since it would be unnecessary to print millions of coupons for distribution to the customers utilizing newspapers, magazines or a direct mailing, the time between the determination of which items would be subject to the "shop the dots" and the progressive couponing technique and the implementation of the discounts would be markedly reduced.

The reconciliation of the cashier's drawer will be affected by the introduction and processing of the "paperless electronic" coupons. In order to allow the cashier to balance the register against the money on hand versus the purchases made, a cashier's personal smart card reconciliation unit 74 is provided. Each cashier would be issued a personalized smart card 72, which would be inserted into the reader/writer section of the reconciliation unit 74 to log into the in-store central computer system 70.

At the beginning of the shift, the cashier will proceed to open the register and to activate the master reader/writer 62 at the register by inserting the smart card 72 therein. This insertion will notify the system of who is responsible for the reconciliation of the register upon completion of the shift.

At the end of the shift, the cashier will again insert the card 72 into the master reader/writer 62 to collect and record all of the applicable data onto the memory of the card. This action will be interpreted by the master reader/writer 62 at the end of the specific shift. Having concluded this operation, the cashier will remove the drawer and proceed to a private area for reconciliation. At this time, in order to balance the drawer, the cashier will insert the smart card 72 into the reader/writer of the reconciliation unit 74, and a printer provided in this unit will generate a written report.

The present system also includes a national reconciliation network employing national master computer system 78. This system would periodically communicate with the in-store central computer system 70 and collect information relating to billing, report generation and total reconciliation. The data sorting process will allow the separation by manufacturer of all "paperless electronic" coupons' face value owed by the national master computer system 78 to the retailers 80 in order that they may be submitted to the manufacturers 76 for reimbursement, as well as simultaneously tracking in-store promotions.

It is important to note that, while it is possible that a customer would purchase and completely utilize the discounts available in a single trip to a retail establishment, the system and method according to the present invention contemplates that the customer would retain his or her smart card and utilize it during several trips to one or more retail establishments. Indeed, the fact that the information relating to this customer identification number, and the products previously purchased by the customer, is maintained in the memory of the smart card, allows the customer to employ the smart card at various establishments which are not even linked to one another by a national, or central computer system. The smart card can be recharged with values up to 10,000 times and at any participating store.

Although the present invention as described hereinabove envisions a system in which the customer purchases the smart card for a certain percentage of the total value of discounts applied to the card, such as 10%, as well as purchasing additional amounts of discount values when the balance on the smart card becomes low, the present invention also contemplates a system in which manufacturers and/or retailers contribute a certain percentage, such as 10%, of the coupon face value.

As a customer in possession of the smart card 2 approaches the checkout counter of any participating store, the smart card 2 would be inserted into the proper reader/writer provided at the register. This reader/writer alone, or in combination with the store's main computer, would conduct a series of tests on the smart card as previously described. Additionally, the memory of the smart card 2 will have a section dedicated to accumulating individual running balances attributed to particular manufacturers or retailers who offer discount coupons. This is made possible because of the uniqueness of bar codes and because of integrating unique identification numbers as they relate to specific manufacturers and retailers participating in the system.

As each item that has a coupon value associated with it is scanned (either "shop the dots" or progressive couponing), this information will be compared with the smart card inserted in the reader/writer, which will interrogate a "float" section of the smart card's memory to determine if any products for which coupon discounts have been applied belong to the same identification number. If the smart card has indicated that various coupons have been discounted from various manufacturers and retailers, an additional amount, based upon the present use of the couponing system, will be added to this account. If no account has been found, a new account for that particular identification number will be initiated, and a balance equal to a percentage of the coupon, such as 10% of the face value of the coupon being redeemed, will appear in this account. When additional items are scanned, the same testing procedure will take place.

By the end of the transaction, when the customer removes the smart card, the memory of the smart card will have one or more accounts open with float balances equaling a certain percentage, such as 10% of the total face value discount provided.

Upon reconciliation with the manufacturers and retailers, this percentage will be billed and will become income to the credit card company. Therefore, when the customer wishes to recharge the smart card, this particular percentage will be used to recharge the card, and the appropriate manufacturers and retailers will be billed.

When a customer holding the smart card enters any participating store and proceeds to insert the card into the reader/writer of the best buy terminal, the reader/writer will determine that the total face value of the card is below a certain standard, which should be tied to the dollar value equal to the highest single trip savings in memory. The reader/writer will advise the customer that it is time to recharge the card or to "cash-out". The reader/writer will proceed to add every float balance present in the card and produce a total float amount. This total will equal 10% of the coupon face values already used by the customer, which will be enough to purchase new face value coupons totaling 10% of the amount. For example, if the total float balance equals $18.55, the card will be recharged with $185.50. In the event that the coupon holder does not wish to recharge the card and wants to "cash-out", he or she will be instructed to go to a customer service desk and will receive a check in the amount of $18.55.

Certain changes may be made in the above-noted system without departing from the scope of the invention herein described. It is intended that all matter contained in the above description and shown in the accompanying drawings shall be interpreted as illustrative and not in a limiting sense.

What is claimed is:

1. A system for providing discounts to products purchased by a customer at a retail establishment, comprising:
 a list of the products to which discounts are to be applied;
 a computer system provided with a memory containing said list of the products, a discount amount applied to the products included in said list, the expiration of said discount amount, as well as the retail value of the products included in said list;
 at least one checkout station in communication with said computer system, said checkout station including a first terminal for entering information relating to products purchased by the customer and a second terminal provided with a reader/writer device; and
 a card retained by the customer, said card provided with an interface device and a memory, said memory initially programmed with a first monetary amount from which discounts based upon the products purchased by the customer are deducted, said first monetary amount read by said second terminal, said second terminal writing a second monetary amount into said memory reflecting the discount applied to the products purchased by the customer based on the information included in said computer system.

2. The system in accordance with claim 1, wherein said computer system is a local computer system, completely contained in a single retail establishment.

3. The system in accordance with claim 2, further including a plurality of local computer systems, each local computer system completely contained in a single retail establishment.

4. The system in accordance with claim 2, further including a central computer system in communication with said local computer.

5. The system in accordance with claim 3, further including a central computer system in communication with said plurality of local computers.

6. The system in accordance with claim 2, further including a third terminal in communication with said local computer for initially issuing said card.

7. The system in accordance with claim 4, further including a third terminal in communication with said central computer system for initially issuing said card.

8. The system in accordance with claim 1, wherein said second terminal is provided with a means for issuing said card and for increasing the monetary amount stored on said card.

9. The system in accordance with claim 1, further including a fourth terminal and a printing device provided at the retail establishment and in communication with said computer system, said fourth terminal provided with a means for reading the information provided on said card and comparing said information with product information contained in said computer system to provide a printed output indicating the best buys available to the customer.

10. The system in accordance with claim 1, further including a plurality of shelf tags, each shelf tag associated with a product to which a discount is to be applied.

11. The system in accordance with claim 10, wherein each of said shelf tags is affixed to a shelf in the retail establishment in proximity to the product to which a discount is to be applied.

12. The system in accordance with claim 11, wherein each of said shelf tags includes a notation of the discount available to a particular product.

13. The system in accordance with claim 12, wherein said notation of the discount on each of said shelf tags includes a plurality of symbols, at least one symbol increasing in monetary value with respect to a previous symbol, indicating the existence of an increased discount applied to the customer if particular products are purchased on more than one occasion.

14. The system in accordance with claim 13, wherein each of said symbols is a different color.

15. The system in accordance with claim 12, wherein said shelf tags are provided with a top, clear portion and a lower portion, and said notation of the discount being included on said lower portion, said top, clear portion affixed to product indicators provided on said shelf of the retail establishment.

16. The system in accordance with claim 13, wherein said shelf tags are provided with a top, clear portion and a lower portion, and said notation of the discount being included on said lower portion, said top, clear portion affixed to product indicators provided on said shelf of the retail establishment.

17. The system in accordance with claim 16, wherein a replication of said plurality of symbols is affixed to said product indicators when said shelf tags are removed.

18. The system in accordance with claim 15, wherein a replication of said plurality of symbols is affixed to said product indicators when said shelf tags are removed.

19. The system in accordance with claim 13, wherein said card is an integrated circuit smart card and said memory is an erasable, programmable memory, and said card is further provided with a microprocessor, said erasable, programmable memory of said card containing information therein relating to the number and types of products which have previously been purchased by the customer.

20. The system in accordance with claim 5, wherein said local computer system is provided with a reconciliation means for reconciling the total monetary amount of the products purchased by the customer with the monetary amount discounted.

21. The system in accordance with claim 20, wherein said reconciliation means is in communication with said central computer system.

22. The system in accordance with claim 1, wherein said card is an integrated circuit smart card and said memory is an erasable, programmable memory, and said card is further provided with a microprocessor, said erasable, programmable memory of said card containing information therein relating to the number and types of products which have previously been purchased by the customer.

23. A method of providing discounts to products purchased by a customer at a retail establishment, comprising the steps of:
developing a list of products to which a discount is to be applied at a central location;
communicating said list of products to at least one retail establishment;
entering said list of products along with their respective discounts, and the expiration date of said discounts, into a local computer system provided at each of the retail establishments, said local computer system also provided with the retail price of said list of products;
issuing a card to at least one customer, said card provided with an interface device, and a memory, said memory initially programmed with a first monetary amount from which the discounts based upon the products purchased by the customer are to be deducted;
each customer obtaining a plurality of products from the retail establishment;
entering information relating to each of the products obtained by the customer at a first terminal in communication with said local computer system;
comparing said information relating to each product entered in the previous step to retail price information as well as whether a particular product is subject to a discount, said comparison step performed in said local computer system;
inserting said card into a second terminal including a reader/writer;
comparing information contained in said memory of said card with information contained in said local computer system relating to the products which are subject to a discount;
writing a second monetary amount reflecting the monetary amount of discounts given to the customer in said memory.

24. The method in accordance with claim 23, wherein said card is an integrated circuit smart card further provided with a microprocessor, and said memory being an erasable, programmable memory.

25. The method in accordance with claim 23, further including the step of electronically communicating said list of products to each local computer system from a central computer system.

26. The method in accordance with claim 24, further including the step of initially issuing said smart card at a second terminal remote from said first terminal.

27. The method in accordance with claim 25, further including the step of increasing the monetary value of said card at said second terminal.

28. The method in accordance with claim 26, further including the step of increasing the monetary value of said smart card at said first terminal.

29. The method in accordance with claim 23, further including the step of producing a plurality of shelf tags, each of said shelf tags affixed to a shelf in the retail establishment in proximity to the product to which a discount is to be applied.

30. The method in accordance with claim 24, further including the step of producing a plurality of shelf tags, each of said shelf tags affixed to a shelf in the retail establishment in proximity to the product to which a discount is to be applied.

31. The method in accordance with claim 30, further including the steps of:

producing a plurality of shelf tags, each provided with a plurality of symbols, at least one symbol increasing in monetary value from a previous symbol, indicating an increased discount applied to the customer if particular products are purchased on more than one occasion;

comparing said plurality of products obtained by each customer with information contained in said erasable, programmable memory of said card to determine if any of said plurality of products are subject to increased discounts based upon previous purchases made by the customer; and writing information into the erasable, programmable memory of said card relating to the type of product which has been obtained by the customer.

32. The method in accordance with claim 23, further including the step of reconciling the total monetary amount of the products purchased by the customer with the monetary amount discounted.

33. The method in accordance with claim 31, further including the step of reconciling the total monetary amount of the products purchased by the customer with the monetary amount discounted.

34. The method in accordance with claim 23, further including the step of allowing the customer to retain said card after said programming step to use said card at a second retail establishment.

35. The method in accordance with claim 24, further including the step of programming said erasable, programmable memory of said card with a new balance.

36. The method in accordance with claim 31, further including the step of writing information into the erasable, programmable memory relating to the number of times a particular product has been purchased.

* * * * *